US008218579B2

(12) United States Patent
Liu et al.

(10) Patent No.: US 8,218,579 B2
(45) Date of Patent: Jul. 10, 2012

(54) SELF-ADAPTIVE JITTER BUFFER ADJUSTMENT METHOD FOR PACKET-SWITCHED NETWORK

(75) Inventors: Erwu Liu, Shanghai (CN); Gang Shen, Shanghai (CN); Shan Jin, Shanghai (CN); Luoning Gui, Shanghai (CN)

(73) Assignee: Alcatel Lucent, Paris (FR)

( * ) Notice: Subject to any disclaimer, the term of this patent is extended or adjusted under 35 U.S.C. 154(b) by 2401 days.

(21) Appl. No.: 10/941,839

(22) Filed: Sep. 16, 2004

(65) Prior Publication Data
US 2005/0058146 A1 Mar. 17, 2005

(30) Foreign Application Priority Data

Sep. 17, 2003 (CN) .................................. 03 1 51016

(51) Int. Cl.
*H04J 3/06* (2006.01)
(52) U.S. Cl. ........................................ 370/517; 375/356
(58) Field of Classification Search .................. 370/516,
370/519, 356, 503, 509, 394, 252, 352, 576,
370/518; 375/356, 359; 714/761, 762, 763
See application file for complete search history.

(56) References Cited

U.S. PATENT DOCUMENTS

| 5,623,483 | A | 4/1997 | Agrawal et al. | |
|---|---|---|---|---|
| 5,864,415 | A | 1/1999 | Williams et al. | |
| 6,434,606 | B1 * | 8/2002 | Borella et al. | 709/214 |
| 6,452,950 | B1 * | 9/2002 | Ohlsson et al. | 370/516 |
| 6,658,027 | B1 * | 12/2003 | Kramer et al. | 370/516 |
| 6,683,889 | B1 * | 1/2004 | Shaffer et al. | 370/516 |
| 6,693,921 | B1 | 2/2004 | Whitfield | |
| 6,862,298 | B1 * | 3/2005 | Smith et al. | 370/516 |
| 7,006,511 | B2 * | 2/2006 | Lanzafame et al. | 370/412 |

(Continued)

FOREIGN PATENT DOCUMENTS

| CN | 1350738 A | 5/2002 |
|---|---|---|
| CN | 1428976 A | 7/2003 |
| CN | 1433192 A | 7/2003 |

(Continued)

OTHER PUBLICATIONS

Performance Technologies: "Adaptive Jitter Buffer Management for Voice Over IP Rev. 1.1", Technology White Paper, 'Online!—Dec. 27, 2000, pp. 1-7, XP002323663.

(Continued)

*Primary Examiner* — Huy D Vu
*Assistant Examiner* — Dady Chery
(74) *Attorney, Agent, or Firm* — Sughrue Mion, PLLC

(57) ABSTRACT

A self-adaptive jitter buffer adjustment method for packet-switched network is presented in this invention, which involves both positive adjustment to jitter buffer and negative adjustment to jitter buffer. The positive adjustment part performs a positive adjustment to the jitter buffer according to an indication of a sequence number of the packet delaying, to absorb larger network jitters by dynamically detecting sequence numbers of the packets in the jitter buffer. The negative adjustment part performs a negative adjustment to the jitter buffer when the filling level descends, to match smaller network jitters by periodically detecting a filling level of the jitter buffer. This invention realizes the dynamic tracking of network jitter, so that a self-adaptive adjustment to the jitter buffer working parameters can be achieved. Comparing with traditional methods for self-adaptive buffer adjustment, the present method reduces the complicacy and computational costs of the self-adaptive jitter buffer adjustment algorithm. At the same time, the impact of self-adaptive jitter buffer adjustment on the performance of the entire system is greatly reduced.

12 Claims, 3 Drawing Sheets

U.S. PATENT DOCUMENTS

| | | | |
|---|---|---|---|
| 7,263,109 B2* | 8/2007 | Ternovsky | 370/503 |
| 7,359,324 B1* | 4/2008 | Ouellette et al. | 370/230 |
| 2002/0126691 A1 | 9/2002 | Strong | |
| 2002/0167911 A1* | 11/2002 | Hickey | 370/252 |
| 2003/0021287 A1 | 1/2003 | Lee et al. | |
| 2003/0086372 A1* | 5/2003 | Pate et al. | 370/235 |
| 2003/0123460 A1 | 7/2003 | Mackiewich et al. | |
| 2003/0133460 A1 | 7/2003 | Lee et al. | |
| 2003/0210681 A1* | 11/2003 | Sumi et al. | 370/352 |
| 2004/0076191 A1* | 4/2004 | Sundqvist et al. | 370/516 |
| 2004/0120309 A1* | 6/2004 | Kurittu et al. | 370/352 |
| 2005/0047396 A1* | 3/2005 | Helm et al. | 370/352 |

FOREIGN PATENT DOCUMENTS

| | | |
|---|---|---|
| EP | 1 104 958 A2 | 6/2001 |
| WO | WO 00/42749 | 7/2000 |
| WO | 03/017545 A1 | 2/2003 |
| WO | 03/052946 A2 | 6/2003 |

OTHER PUBLICATIONS

K. Rothermel et al, "An Adaptive Stream Synchronization Protocol", Proceedings of the IEEE International Workshop on Network and Operating Systems Support for Digital and Audio and Video, Apr. 18, 1995, pp. 189-201 XP000826447.

* cited by examiner

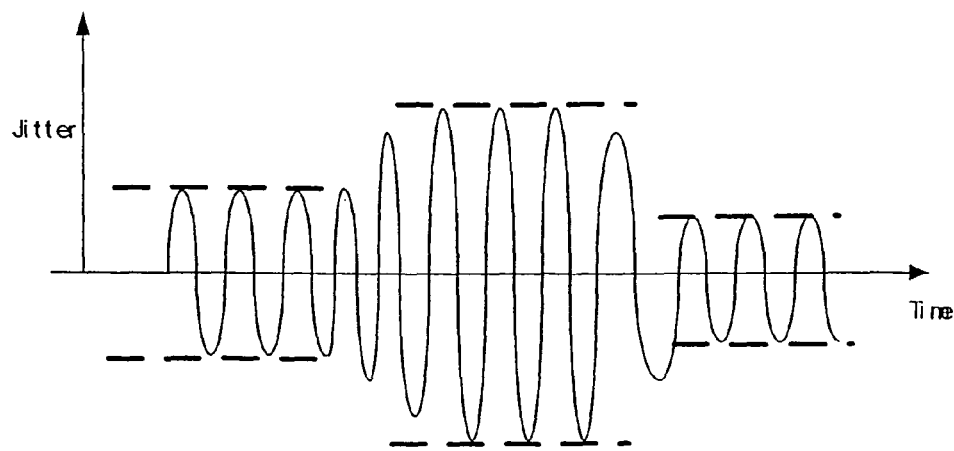
Fig. 4.1
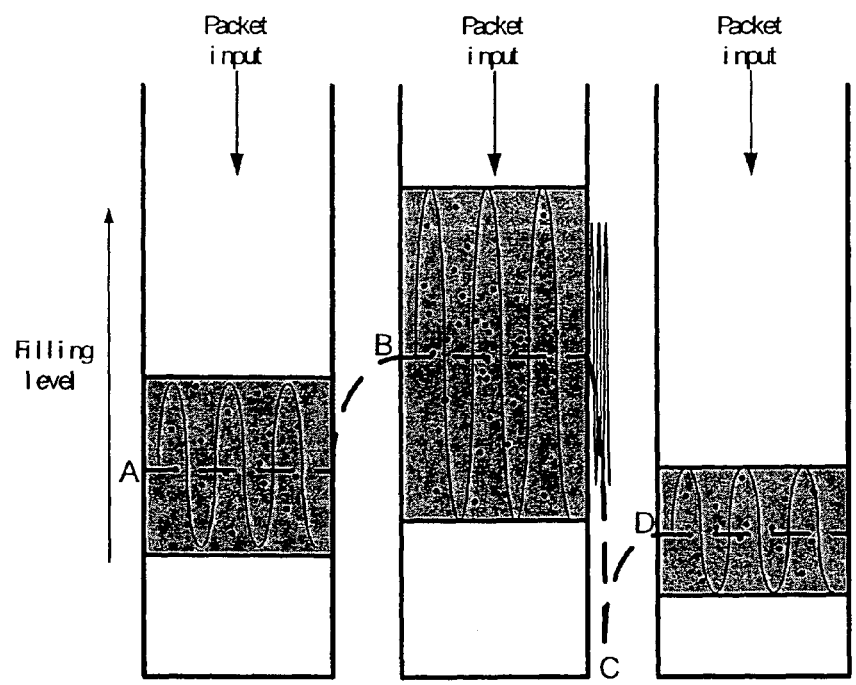
Fig 4.2

SELF-ADAPTIVE JITTER BUFFER ADJUSTMENT METHOD FOR PACKET-SWITCHED NETWORK

(1) TECHNICAL FIELD

The present invention relates to a telecommunication method for packet-switched network, particularly to a self-adaptive jitter buffer adjustment method, which can be used in packet-switched network communication device.

(2) BACKGROUND ART

At present, packet-switched network has been widely used for its advantages, such as low price, flexible protocol, good scalability and mature technology. Many real-time services, such as IP telephony, TDM (Time Division Multiplexing) circuit emulation service and so on, have been or will be transferred over the packet-switched network. When real-time periodical service is being transferred over packet-switched network, due to queuing, congestion and variety in signal path, the network delay of the data packet keeps changing randomly, which is called network jitter delay. Thus, the time when the periodicity data packets sent from the sender arrive at the receiver is unsure, and it poses an obstacle for the receiver to resume the periodicity data packets sent from the sender. Therefore, how to absorb the network jitters introduced by packet-switched network is the key point for transferring periodical real-time services, such as TDM, in packet-switched network.

Currently, the common method for absorbing the network jitter is using a jitter buffer at the receiver. As shown in FIG. 1, data packets 1, 2, 3, 4, 5 and 6 from the sender 100 reach the receiver 120 over packet-switched network 110. Due to the existence of the delay jitter, the sequence of these packets can be disturbed when they pass the packet-switched network 110, and will be changed when they reach the receiver 120. The sequence of these packets is: 1, 3, 2, 5, 4 and 6. At the same time, the delay jitter brings about the network delay nd, and the receiver 120 uses jitter buffer 130 to absorb delay jitter, which causes the buffer delay bd. Thus, the gross output delay ted of data packets from the sender 100 to the jitter buffer is the sum of the network delay nd and the buffer delay bd.

In order to eliminate the delay jitter introduced by packet network, the size of the jitter buffer at least must be set to be 2 times packet rate×network jitter, and the normal working point of the jitter buffer at least must be set at packet rate× network jitter. For example, assuming the packet rate is 400 pks/s (packets/second), each packet has to experience 400× 0.01=4 extra packets of queuing delays for absorbing 10 ms of network jitter. At present, there are mainly three types of methods for absorbing network jitters by using jitter buffers at the receiver. 1) A jitter buffer of fixed size. Such as the earlier experimental system for transferring TDM service on the Ethernet, in which the network jitter is assumed to be small, hence the fixed size jitter buffer is to be used. 2) A jitter buffer of successively increasing size. As an improvement to the first method, it uses the successively increasing size jitter buffer to absorb the largest network jitter. 3) Self-adaptive jitter buffer, which is a kind of jitter buffer whose size can be adjusted dynamically. This method has drawn growing attention in transferring TDM service over packet-switched network. This is mainly because of the wide range of services it undertakes, the complexity of the network, and the varied jitters under different circumstances of the network, in the practical packet-switched network. For example, a network jitter may be 20 ms at one period of time, 300 ms at the next period, and 10 ms in another next period. Obviously, neither the jitter buffer of fixed size nor the jitter buffer of successively increasing size fits the circumstances of the network, because the size of the jitter buffer will be set to absorb the 300 ms jitter (as for packets rate at 400 pks/s, the size of the jitter buffer is 240 packets) in both of the methods. Even if the network jitter decreases to 20 ms, the packets have to experience 120 extra packets queuing delays. Such a large delay is unsuitable for certain real-time applications. Therefore the jitter buffer must perform self-adaptive adjustment following the circumstances of the network. Under the above mentioned circumstances of the network, the packet delay is 120 packets when the circumstance is bad (300 ms jitter), however, it can be decreased to 4 packets when the circumstance turns better (10 ms) by using self-adaptive buffer. Generally, the traditional self-adaptive jitter buffer method adopts the prediction technique to the network jitter. The jitter prediction technique is based on either analyzing the jitters of the historically arrived packets, or directly on performing jitter prediction to changes of the filling level of the jitter buffer. For example, a jitter buffer adjustment method based on historically arrived packet jitter was presented in the article "An Empirical Study of a Jitter Management Scheme for Video Teleconferencing", Donald L. Stone and Kevin Jeffay, Multimedia Systems Volume 2, Number 2, 1995; a self-adaptive jitter buffer adjustment method based on the changes of the filling level of the jitter buffer was presented in the article "An adaptive stream synchronization protocol", written by Kurt Rothermel and Tobias Helbig and published in "Network and Operating System Support for Digital Audio and Video", April 1995 pages 189-202, in which the architecture of self-adaptive adjustment theory is shown in FIG. 2. A large amount of threshold values and counters have been used in this self-adaptive adjustment procedure, HWM (High Water Mark) and LWM (Low Water Mark) are respectively defined as the high and low overflow threshold of the jitter buffer. Between HWM and LWM, and within the area of UTB (Upper Target Boundary) and LTB (Lower Target Boundary) is a target working zone. When the filling level is out of the working zone, the working parameters of the buffer will be adjusted by the self-adaptive procedure, and the filling level will be dragged back to the working zone, where HWM, LWM, UTB, LTB should all be adjusted according to the condition of network jitter. The self-adaptive adjustment method above was developed according to the characteristics of real-time services, and especially optimized for transferring real-time voice over the packet-switched network. More specifically, these methods should take into account the compromise between the end-to-end delay and the packet-dropping rate (as for real-time voice service, the typical value of the dropping rate is 5%). Generally speaking, the longer the buffer length is set to be, the larger the jitter can be absorbed, and the smaller the packets dropping rate is, but the longer the end-to-end delay is; on the contrary, the shorter the buffer length is set to be, the smaller the jitter can be absorbed, and the larger packets dropping rate is, but the shorter the end-to-end delay is. In practice, TDM service entails small packet-dropping rates, for example, the frame dropping rate of 2.048 Mbits/s E1 circuit simulation service on the Ethernet is defined to be lower than $7 \times 10^{-6}$ by MEF (Metro Ethernet Forum). Obviously, if we take into account the packet dropping rate when adjusting the jitter buffer, quite a lot of statistic information is needed, and this will increase the complicacy and computational costs of self-adaptive adjustment algorithm.

(3) SUMMARY OF THE INVENTION

The object of the present invention is to provide a self-adaptive jitter buffer adjustment method for packet-switched network, which is capable of tracking the network jitter effectively, adjusting the parameters of the jitter buffer dynamically, ensuring the end-to-end performance, and outputting the ordered packets.

This object is attained through the following technical solution, that is a self-adaptive jitter buffer adjustment method for packet-switched network, comprising the steps of:

a) initializing a jitter buffer, receiving data packets and storing the packets into the jitter buffer;
b) dynamically detecting sequence numbers of the data packets in the jitter buffer and performing a positive adjustment to the jitter buffer, according to an indication of a sequence number of packet delaying, to absorb larger network jitter;
c) periodically detecting a filling level of the jitter buffer and performing a negative adjustment to the jitter buffer, when the filling level descends, to match smaller network jitter.

The Real-time Transport Protocol/Real-time Transport Control Protocol (RTP/RTCP) Data is adopted for transmission of the data packets described above.

In the present method, the parameters of the jitter buffer are adjusted according to both the indication of the packet delay and the changes of the filling level of the buffer. Packet dropping rate is not taken into account during the self-adaptive adjustment procedure. Thus, the present method satisfies the demand of transferring TDM service over packet-switched network, and realizes the object of tracking network jitter dynamically. Compared with traditional methods for self-adaptive buffer adjustment, the presented method greatly lowers the complicacy and computational costs of self-adaptive jitter buffer adjustment algorithm. At the same time, the impact of self-adaptive jitter buffer adjustment on the performance of the whole system is greatly reduced.

This invention also effectively deals with the delay spikes, which is hard for ordinary self-adaptive jitter buffer to process, realizes rebuilding of the packet sequence for output, and ensures normal communication from one end to the other.

(4) BRIEF DESCRIPTION OF THE DRAWINGS

FIG. 4.1 is a block diagram of a typical network jitter.

FIG. 4.2 is a block diagram showing the self-adaptive jitter buffer adjustment based on the network jitter in this invention.

(5) DETAIL DESCRIPTION OF THE INVENTION

The invention will be explained in more details with reference to the accompanying drawings as following.

Figure 1:
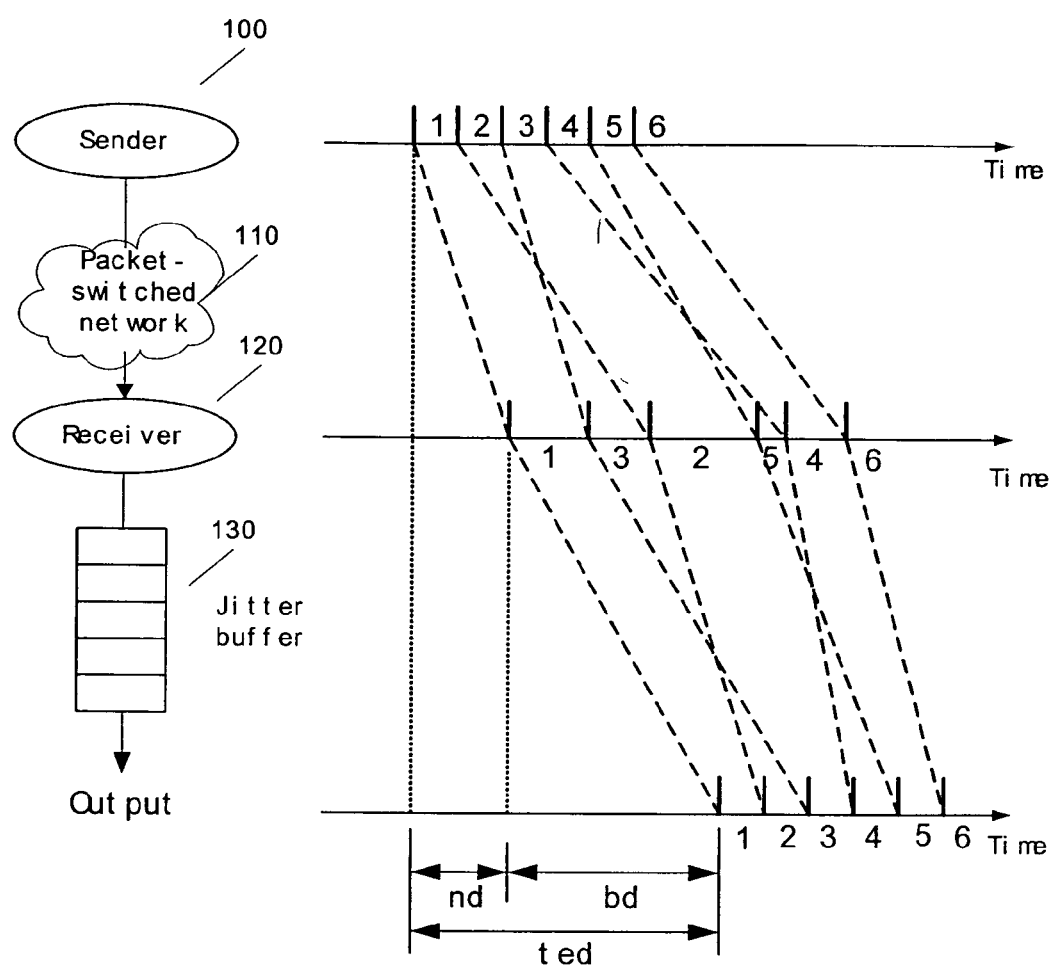
FIG. 1 is a block diagram of jitter delay and the absorbing of jitter delay, disturbed sequence of arrived packets and re-arranged sequence of the packets.
Figure 2:
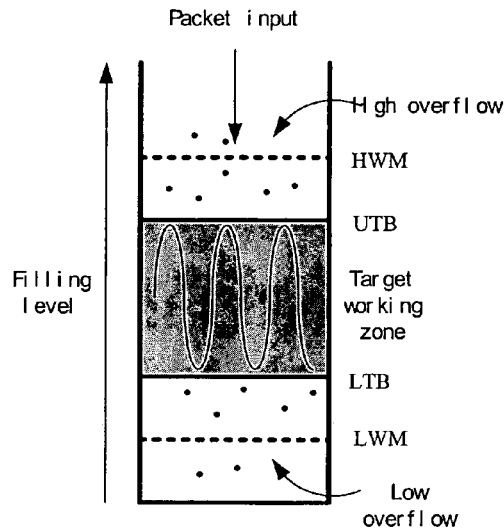
FIG. 2 is a block diagram of the architecture of self-adaptive jitter buffer according to traditional method.
Figure 3:
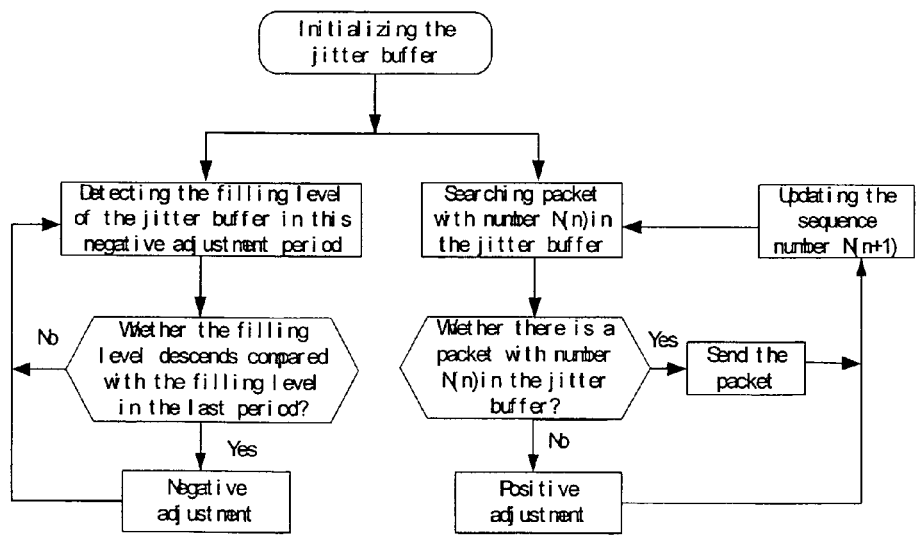
FIG. 3 is a flow chart showing steps of adjusting the self-adaptive jitter buffer according to this invention.

FIG. 3 is a flow chart showing the method of adjusting the self-adaptive jitter buffer according to this invention, which comprises the following steps of:

1) Initializing a Jitter Buffer:

Parameters, such as the negative adjustment period T of jitter buffer, the time interval $\Delta S$ for sampling the filling level of the jitter buffer during negative adjustment period T, the minimum threshold C of the normal working point of the jitter buffer, the initial maximum value (Max(0)) and the initial minimum value (Min(0)) of the filling level of jitter buffer, the initial normal working point A(0) of the jitter buffer, the initial data packet number N(0), and the difference value σ satisfying the condition of the negative adjustment, of the self-adaptive jitter buffer for dynamic adjustment will be preset in this initializing step.

Upon completion of jitter buffer initialization, receiving of data packets begins. The Real-time Transport Protocol/Real-time Transport Control Protocol (RTP/RTCP) can be adopted for transmission of data packets between sender and receiver.

2) Detecting the Indication of the Packet Delay and Performing Positive Adjustment:

Generally, the sender periodically sends data packets of sequence numbers to the packet-switched network, and the data packets may be non-sequentially reached the receiver in a non-periodical way.

During a local clock period, the receiver fetches a data packet from the jitter buffer. Assuming the searched sequence number of packet is N(n), the system will search if there is a data packet with the number that matches this sequence number in the jitter buffer based on the sequence number of packet N(n). If there is, this packet with sequence number N(n) will be taken out and output. The current packet sequence number will be updated to N(n+1), and the system will keep searching for the matched sequence number to ensure that the packet output will be in order. If there is no sequence number of packet that matches the current sequence number N(n), the packet with sequence number N(n) will arrive after some delay and the jitter buffer will enter its positive adjustment procedure.

In the positive adjustment procedure, some data packets will be inserted into the jitter buffer to absorb larger network jitter, and those data packets in the jitter buffer, whose sequence number is smaller than the current sequence number N(n), will be discarded (these packets are the overdue packets needing processing no longer.). After that, the current sequence number will be updated to N(n+1). In the next local clock period, the above steps are repeated.

Said inserted packets can be the data packets which have been output from the jitter buffer at previous times.

3) Detecting the Filling Level of the Jitter Buffer and Performing the Negative Adjustment:

Various methods can be adopted to detect the filling level of the jitter buffer. As a preferred embodiment, here, the filling level is sampled several times in one period to ascertain the maximum value and the minimum value of the filling level of the jitter buffer, and the maximum value and the minimum value can basically reflect the condition of the filling level of the jitter buffer.

In order to reflect the changes of the filling level of the jitter buffer, here, compare the maximum value Max(m) and the minimum value Min(m) of the filling level of the jitter buffer in the mth negative adjustment period T(m) with the maximum value (Max(m−1)) and the minimum value (Min(m−1)) of the filling level of the jitter buffer in the previous negative adjustment period T(m−1). If the following conditions are satisfied, it means the filling level of the jitter buffer descends in this period. A command for negative adjustment will be called by the system, and the jitter buffer will enter the negative adjustment procedure, $$\text{Max}(m) \leq \text{Max}(m-1) - \sigma$$

$$\text{Min}(m) \geq \text{Min}(m-1) - \sigma$$

where σ is the preset value for performing negative adjustment.

The normal working point of the current jitter buffer is lowered to the minimum threshold C by dropping some data packets of the jitter buffer during negative adjustment to the jitter buffer. Then, the above steps are repeated in the next negative adjustment period m+1.

Either the number of the data packets or the bits of the data packets can be used to denote the said filling level of the jitter buffer.

FIG. 4.1 is a block diagram of a typical network jitter. The network presents different jitter features at different time periods. FIG. 4.2 is a block diagram showing the self-adaptive jitter buffer adjustment based on the network jitter according to this invention. When the system startups, the normal working point adjusts itself to point A to absorb the current network jitter adequately. After a while, the network jitter will increase gradually due to the changes of the condition of the network (such as the congestion). The indication of packet delay appears, and the jitter buffer will enter the positive adjustment procedure. The normal working point of the jitter buffer will ascend from point A to point B to absorb the current network jitter. Then, the network jitter will decrease gradually due to the changes of the condition of the network (such as the disappearance of the congestion, the upgrading of the condition of the network), the filling level of the jitter buffer will descend, and the jitter buffer will enter the negative adjustment procedure. The normal working point of the jitter buffer will descend from point B to the minimum threshold C. After that, because the size of the jitter buffer is not big enough to absorb the network jitter, indication of packet delay appears again, and the jitter buffer will enter the positive adjustment procedure. The normal working point of the jitter buffer will ascend from the minimum threshold C to point D to absorb the current network jitter.

The invention has been described in more details with reference to the accompanying drawings in above. The person who skills in the art can make various modifications based on the above description of the invention, such as means of detecting the indication of the packets delay, means of detecting the filling level of the jitter buffer, the adjustment object of the buffer and so on. Therefore, some detail in the embodiment cannot be the definition of the invention. The invention will make the scope defined by claims attached as the protection of the invention.

The invention claimed is:

1. A self-adaptive jitter buffer adjustment method for packet-switched network, wherein the said method comprises:
   a) initializing a jitter buffer, receiving data packets and storing these packets into the jitter buffer;
   b) dynamically detecting sequence numbers of the packets in said jitter buffer and performing a positive adjustment to said jitter buffer, according to an indication of a sequence number of the packet delaying, to absorb larger network jitters;
   c) periodically detecting a filling level of said jitter buffer and performing a negative adjustment to said jitter buffer, when the filling level descends, to match smaller network jitters.

2. The self-adaptive jitter buffer adjustment method for packet-switched network according to claim 1, wherein in step a) the Real-time Transport Protocol/Real-time Transport Control Protocol (RTP/RTCP) is adopted for transmission of the data packets.

3. The self-adaptive jitter buffer adjustment method for packet-switched network according to claim 1, wherein step b) further comprises the steps of:
   b1) searching whether there is a data packet having a current sequence number of packet (N(n)) in the jitter buffer within a local clock period, and if there is, outputting the data packet and updating the current sequence number (N(n)) to the next (N(n+1));
   b2) if there is no any data packet having the current packet sequence number, inserting some data packets into the jitter buffer, discarding those data packets whose number is smaller than the current sequence number, and updating the current sequence number to the next (N(n+1));
   b3) repeating step b1) and step b2) within the next clock period.

4. The self-adaptive jitter buffer adjustment method for packet-switched network according to claim 3, wherein in step b2), the inserted packets may be data packets which have been output from the jitter buffer at a previous time.

5. The self-adaptive jitter buffer adjustment method for packet-switched network according to claim 1, wherein said step c) further comprises the steps of:
   c1) sampling the filling level of the jitter buffer for several times in the mth negative adjustment period (T) of the jitter buffer, obtaining the maximum value (Max(m)) and the minimum value (Min(m)) of the filling level of the jitter buffer in the negative adjustment period;
   c2) comparing said value Max(m) and Min(m) with the maximum value (Max(m−1)) and the minimum value (Min(m−1)) of the filling level of the jitter buffer in the previous negative adjustment period, obtaining the changes of the filling level;
   c3) if the filling level descends and satisfies the following conditions:

$Max(m) \leq Max(m-1) - \sigma$ $Min(m) \geq Min(m-1) - \sigma$ performing negative adjustment to the jitter buffer to match smaller network jitter, where σ is the preset value for performing negative adjustment;
   c4) repeating step c1) to step c3) in the next negative adjustment period (m+1) of the jitter buffer.

6. The self-adaptive jitter buffer adjustment method for packet-switched network according to claim 5, wherein in said step c), a current normal working point of the current jitter buffer is lowered to the minimum threshold (C) by discarding some data packets in the jitter buffer in the negative adjustment to jitter buffer.

7. The self-adaptive jitter buffer adjustment method for packet-switched network according to claim 1, wherein the performing the negative adjustment is based on a maximum value (Max(m)) and a minimum value (Min(m)) of the filling level of the jitter buffer in the negative adjustment period.

8. The self-adaptive jitter buffer adjustment method for packet-switched network according to claim 7, wherein the maximum value Max(m) and the minimum value Min(m) of the filling level of the jitter buffer in a current negative adjustment period are compared with the maximum value (Max(m−1)) and the minimum value (Min(m−1)) of the filling level of the jitter buffer in a previous negative adjustment period.

9. The self-adaptive jitter buffer adjustment method for packet-switched network according to claim 1, wherein the performing the negative adjustment is based on whether the filling level descends when compared with a previous filling level of a previous time period.

10. The self-adaptive jitter buffer adjustment method for packet-switched network according to claim 1, wherein the negative adjustment comprises lowering a normal working point of a current jitter buffer to a minimum threshold by removing at least one data packet of the jitter buffer.

11. The self-adaptive jitter buffer adjustment method for packet-switched network according to claim 1, wherein the positive adjustment comprises increasing a normal working point of a current jitter buffer to a minimum threshold by inserting at least one data packet of the jitter buffer.

12. The self-adaptive jitter buffer adjustment method for packet-switched network according to claim 1, further comprising:
   determining whether the filling level descends when compared with a previous filling level of a previous time period.

* * * * *